J. J. DEAL.
WARE HOUSE TRUCK.

No. 181,824. Patented Sept. 5, 1876.

WITNESSES:
Wm Garner
F. W. Burnham

INVENTOR:
J. J. Deal
per
F. A. Lehmann, Atty.

UNITED STATES PATENT OFFICE.

JOSIAH J. DEAL, OF WILMOT, OHIO.

IMPROVEMENT IN WAREHOUSE-TRUCKS.

Specification forming part of Letters Patent No. 181,824, dated September 5, 1876; application filed July 11, 1876.

*To all whom it may concern:*

Be it known that I, JOSIAH J. DEAL, of Wilmot, in the county of Stark and State of Ohio, have invented certain new and useful Improvements in Warehouse-Truck; and I do hereby declare the following to be a full, clear, and exact description of the invention, such as will enable others skilled in the art to which it pertains to make and use it, reference being had to the accompanying drawings, which form part of this specification.

The nature of my invention consists in the construction and arrangement of a warehouse-truck for handling and moving boxes and other heavy and cumbersome articles, as will be more fully set forth hereinafter.

Figure 1:
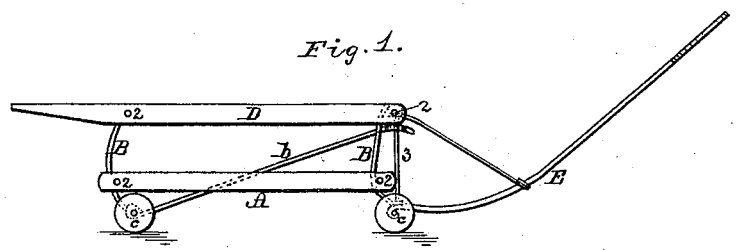
Figure 2:
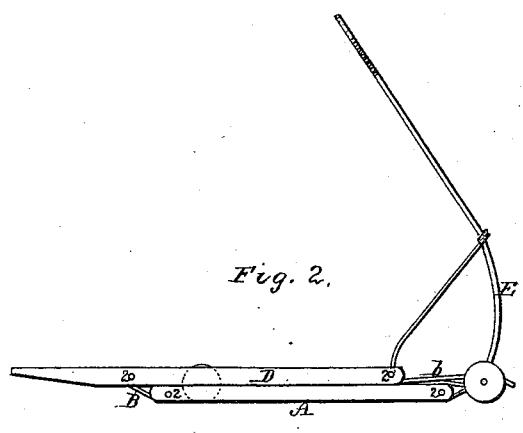

In the annexed drawing, which fully illustrates my invention, Figure 1 is a side elevation. Fig. 2 is a similar view, showing the truck closed; and Fig. 3, a plan view of the same.

Figure 3:
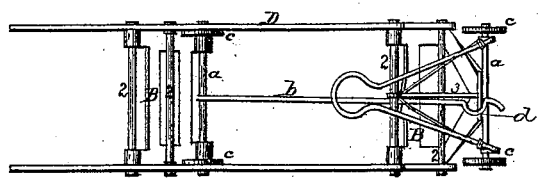

A A represents two parallel bars, which are connected by and pivoted to two end frames, B B. At the lower end of each frame B is an axle, $a$, with wheels $c\ c$ placed upon its ends. The upper ends of the frames B B are connected by two parallel side bars, D D, the ends of which project a suitable distance beyond one end of the truck, and are beveled on their under sides, so as to be wedge-shaped. The frames B and bars D are connected together by the rods 2, that pass through from side to side, as shown in Fig. 3, the lower ones of which bars are placed below the level of the frames. At the front end of the truck is a handle, E, secured to the front axle, said handle being suitably braced, as shown. In the center of the rear end frame B is pivoted a rod, $b$, which has near its front end a lateral bend, $d$, to catch on the king-bolt 3, which passes through axle and thus locks the truck. By means of the independent axle for the front wheels and the king-bolt, the truck can be turned freely around in any direction after hoisting the weight to be moved.

The truck is operated entirely by the handle or double lever E, which, by being raised, causes the truck to be folded or dropped low, so that the projecting ends of the two top bars D D can pass under the article to be moved. Then, by drawing the handle or lever toward the operator, the whole weight can be raised with the upper part of the truck and easily moved on the wheels. When the top of the truck is folded downward, as shown in Fig. 2, the axle and wheels move upward, allowing the lower bars D to rest on the floor. The wheels, being made large enough, project slightly above the upper bars D, thus forming rollers to assist in unloading articles to be moved. It will be seen that the different parts operate so as to give double leverage in raising the weight. The rod $b$ serves the double purpose of a reach, and of a lock, always locking itself when the weight is raised, and can be easily opened by the foot when it is desired to deposit and leave the article to be removed. The top bars D D virtually form the platform on which the goods are carried, and the center side bars A A act as stays or braces to hold the truck firm and solid.

What I claim is—

1. The rocking reach or rod $b$, in combination with the frames B B, platform D, and handle E, substantially as and for the purposes herein set forth.

2. A truck composed of end frames, pivoted side bars, axles, and wheels, and a handle, the said frame being adapted to fold together, so that the wheels will form rollers above the top of the frame to assist in moving the load, substantially as shown.

In testimony that I claim the foregoing I have hereunto set my hand this 30th day of June, 1876.

JOSIAH J. DEAL.

Witnesses:
HENRY GERLOCH,
WM. M. JOHNSTON.